Figure 1:
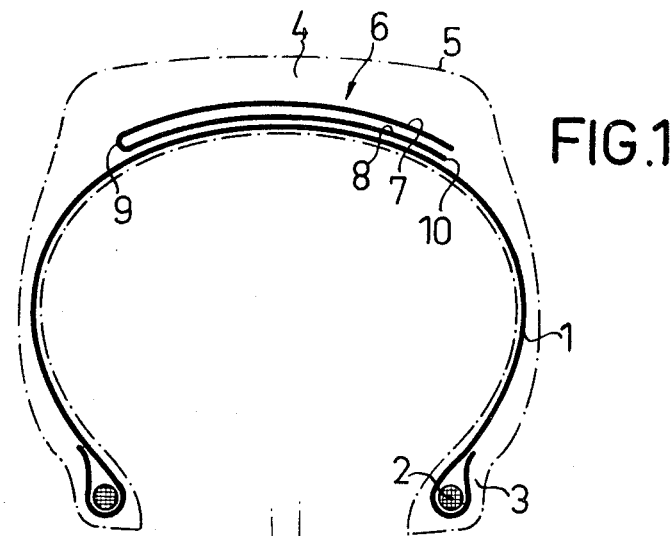

United States Patent
Rach et al.

[11] 3,754,588
[45] Aug. 28, 1973

[54] PNEUMATIC TIRE WITH FOLDED BELT PLIES

[75] Inventors: Heinz-Dieter Rach, Garbsen; Ekkehard Grollich, Hannover, both of Germany

[73] Assignee: Continental Gummi-Werke Aktiengesellschaft, Hannover, Germany

[22] Filed: Apr. 26, 1971

[21] Appl. No.: 137,423

[30] Foreign Application Priority Data
Apr. 30, 1970 Germany.................. P 20 21 267.3

[52] U.S. Cl........................................... 152/361 FP
[51] Int. Cl. ................................................ B60c 9/20
[58] Field of Search............................. 152/361, 354

[56] References Cited
UNITED STATES PATENTS
3,516,468    6/1970    Jones............................ 152/361 FP FOREIGN PATENTS OR APPLICATIONS
1,444,124    5/1966    France.............................. 152/354

*Primary Examiner*—Robert G. Sheridan
*Assistant Examiner*—George H. Libman
*Attorney*—Walter Becker

[57] ABSTRACT

A pneumatic vehicle tire with a folded belt having one or more layers of U-shaped cross section, in which with a positive camber of a vehicle wheel having the said tire mounted thereon, the free ends of the belt legs are located within the shoulder area of the tire and on that side of the tire which faces toward the vehicle on which the wheel is mounted and with a negative camber of the vehicle wheel are located within the shoulder area of that side of the tire which faces away from the vehicle.

2 Claims, 5 Drawing Figures

PATENTED AUG 28 1973 3,754,588

INVENTORS
HEINZ-DIETER RACH
EKKEHARD GROLLICH
BY

PNEUMATIC TIRE WITH FOLDED BELT PLIES

The present invention relates to a pneumatic vehicle tire with a folded belt having one or more layers of U-shaped cross section. By "folded belts" are understood annular reinforcing inserts which are pull-resistant in circumferential direction and which extend substantially over the width of the tread strip, such reinforcing inserts which are arranged between the carcass and the tread strip comprising folded layers, for instance, rubberized cord fabric layers, the folding edges of which extend in the longitudinal direction of the tire.

With heretofore known pneumatic vehicle tires with folded belts of U-shaped cross section, the layers forming the same are so arranged that they are provided in pairs with their free leg ends pointing outwardly. The free ends of the threads or the like forming the U-shaped layers thus form the lateral belt edges.

However, experience has shown that such belt constructions have the tendency to prematurely wear within the region of the tire belt. For this reason it has been suggested to surround the free thread ends at the belt edge by additional fabric layers.

It is an object of the present invention to improve the endurance strength of the above referred to pneumatic vehicle tires without taking steps for enveloping the free thread ends.

This object and other objects and advantages of the invention will appear more clearly from the following specification in connection with the accompanying drawing, in which:

FIG. 1 diagrammatically illustrates a radial section through a portion of a pneumatic vehicle tire according to the invention.

Figure 2:
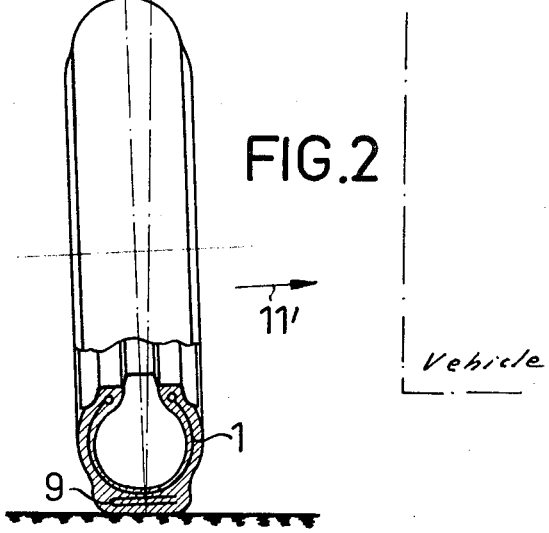

FIG. 2 shows the tire of FIG. 1 partially in section mounted on a rim having a positive camber.

Figure 3:
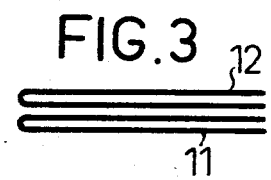
Figure 4:
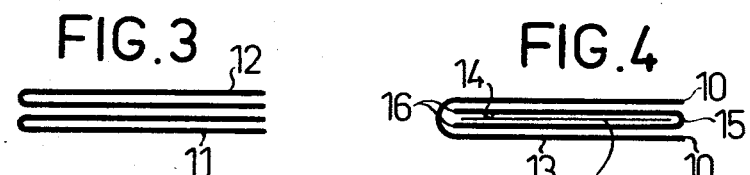
Figure 5:
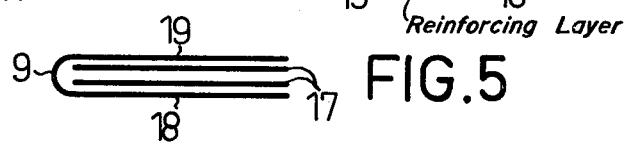

FIGS. 3 to 5 respectively illustrate cross sections of three modifications of belts according to the invention for pneumatic vehicle tires.

The pneumatic vehicle tire with a folded belt according to the present invention is characterized primarily in that the free ends of the legs of the folded belt which extend substantially over the width of the belt are at a positive camber of the vehicle wheel arranged at that edge of the folded belt which faces the vehicle, and with a negative camber are arranged at that edge of the folded belt which faces away from the vehicle.

The invention is based on the employment of U-shaped layers which extend substantially over the width of the belt or of the tread strip and thus determine the width of the belt. The edge of the U-shaped layers which is formed by the folded or bent thread sections is therefore with a positive camber arranged on that side of the belt which faces away from the vehicle, whereas with a negative camber the said edge is located on that side of the belt which faces the vehicle.

The invention is based on the finding that on one hand the belt within the range of its folding edge is liable to defects to a considerably less degree than is the case with that edge of the belt which has the free ending thread ends, and the invention is furthermore based on the finding that it is expedient to take into consideration this difference in stress or wear as caused by the different types of suspensions customary in the motor vehicle industry. The folding edge of the belt is thus placed always at that edge of the tread surface which is subjected to the highest stress, whereas the free ending thread ends should be located at that side of the belt which is subjected to less stress in view of the camber of the vehicle wheel.

Referring now to the drawing in detail, the carcass 1 of a pneumatic tire comprises pull-resistant threads, wires, or the like strength members which extend at a right angle with regard to the circumferential direction of the tire. The ends of such strength members are anchored by being wound around the bead cores 2 in the tire beads 3. Between the carcass 1 and the tread strip 4 with the tread surface 5 there is located the belt 6 which extends substantially over the width of the tread surface 5 and forms a closed reinforcing insert which is substantially pull-resistant in circumferential direction. This reinforcing insert comprises a rubberized cord fabric layer with the two superimposed legs 7, 8, and a folding edge 9 which extends in the circumferential direction of the tire. The pull-resistant threads of the folded belt 6 extend at an angle or incline with regard to the circumferential direction of the tire. In view of the folding and due to the inclined course of the cord threads, a cross connection or cross structure is obtained. The pull-resistant threads in the leg 7 extend in one inclined direction whereas the pull-resistant threads in leg 8 extend in the other inclined direction. The arrangement is such that, as shown in FIG. 1, the legs 7 and 8 extend over the entire width of the tread strip 6 so that the folding edge 9 is located within the region of one tire shoulder and the free ends 10 of legs 7 and 8 are located within the region of the other tire shoulder. Thus, an asymmetric belt structure is provided.

As will be evident from FIG. 2, it is important in this connection that, with the vehicle wheel arranged at a positive camber — the arrow 11' pointing toward the vehicle proper —, the folding edge 9 is located in the outer tire shoulder, in other words, at the edge of the belt 6 which faces away from the vehicle. The adjacent tire shoulder will during operation of the tire be subjected to a higher load. This load can be absorbed by the folding edge at 9, whereas the arrangement of the free thread ends at 10 is sufficient in view of the fact that the pertaining tire shoulder is subjected to a lower specific load.

FIG. 1 shows a belt 6 composed of one layer. This arrangement, however, may according to FIG. 3 also be doubled by employing two superimposed U-shaped layers 11, 12.

According to FIG. 4, likewise two U-shaped folded rubberized cord fabric layers 13, 14 are employed. These layers are, however, boxed into each other in such a way that the folding edge 9 is located at one edge and the folding edge 15 is located at the other edge of the belt. Furthermore, the arrangement is such that the free ends at 10 are all arranged on one side of the tire belt. The freely extending ends at 16 have only a secondary meaning inasmuch as they are enclosed by the layer 13.

It is also possible to combine a U-shaped folded belt layer with belt layers extending in transverse direction. The folding edge 9 is, however, to be arranged in the manner shown in FIG. 1, and the inserts 17 extending in the transverse direction are located between the two legs 19 and 18.

It is, of course, to be understood that the present invention is, by no means, limited to the specific showing in the drawing but also comprises any modifications within the scope of the appended claims.

What we claim is:

1. A pneumatic vehicle tire especially of radially belted type with folded belt means comprising at least one layer folded so as to define a U-shaped cross section with the legs thereof extending substantially over the entire width of said belt means providing a complete interfit, the arrangement being such that the free ends of said legs with a positive camber of the vehicle wheel are located within the shoulder area and on that side of the tire which faces toward the vehicle and with a negative camber of the vehicle wheel are located within the shoulder area of that side of the tire which faces away from the vehicle, said folded belt means including two folded U-shaped layers one of which embraces the other one completely complementing the other, the inner one of said two folded U-shaped layers having its fold located on that side of said belt means on which the free ends of the outer folded U-shaped layer are located.

2. An arrangement in combination according to claim 2, which includes at least one reinforcing layer interposed between the legs of at least one folded layer and extending in a direction transverse to the circumferential direction of the tire.

* * * * *